United States Patent
Bhandari et al.

(10) Patent No.: US 10,095,378 B2
(45) Date of Patent: Oct. 9, 2018

(54) WEB BROWSER TOOLBAR

(75) Inventors: Nitin Bhandari, Fremont, CA (US); James Marzano, Sunnyvale, CA (US); Geoffrey D. Benson, Sunnyvale, CA (US); Ronakkumar Patel, Santa Clara, CA (US); Ethan A. Fassett, San Francisco, CA (US)

(73) Assignee: Performance and Privacy Ireland Limited, Dublin (IE)

( * ) Notice: Subject to any disclaimer, the term of this patent is extended or adjusted under 35 U.S.C. 154(b) by 712 days.

(21) Appl. No.: 13/300,168

(22) Filed: Nov. 18, 2011

(65) Prior Publication Data
US 2012/0137221 A1 May 31, 2012

Related U.S. Application Data

(60) Provisional application No. 61/415,312, filed on Nov. 18, 2010.

(51) Int. Cl.
*G06F 17/30* (2006.01)
*G06F 3/0482* (2013.01)
*G06F 3/0481* (2013.01)
*G06Q 50/00* (2012.01)

(52) U.S. Cl.
CPC ........ *G06F 3/0482* (2013.01); *G06F 3/04817* (2013.01); *G06F 17/30867* (2013.01); *G06F 17/30899* (2013.01); *G06F 17/30905* (2013.01); *G06Q 50/01* (2013.01)

(58) Field of Classification Search
CPC .............. G06F 3/0482; G06F 3/04817; G06F 17/30867; G06F 17/30899; G06F 17/30905

USPC ......................................................... 715/719
See application file for complete search history.

(56) References Cited

U.S. PATENT DOCUMENTS

| | | | |
|---|---|---|---|
| 6,282,548 B1 * | 8/2001 | Burner et al. | |
| 6,490,602 B1 * | 12/2002 | Kraemer | 715/236 |
| 7,136,896 B1 * | 11/2006 | Srinivas | G06F 17/2247 709/203 |
| 2002/0091762 A1 * | 7/2002 | Sohn | G06F 3/0481 709/203 |
| 2005/0050462 A1 * | 3/2005 | Whittle et al. | 715/517 |
| 2005/0198220 A1 * | 9/2005 | Wada et al. | 709/220 |

(Continued)

OTHER PUBLICATIONS

Guy McDowell, "How to Download Streaming Video with DownloadHelper," Jun. 20, 2009, makeuseof.com, pp. 1-4, as captured by WaybackMachine on Jul. 14, 2010.*

(Continued)

*Primary Examiner* — Dino Kujundzic
(74) *Attorney, Agent, or Firm* — Fenwick & West LLP (57) ABSTRACT

A system and a method are disclosed for displaying page elements embedded on a webpage displayed on a handheld computing device. Tools provide one or more functionality to a user, including an ability to view a webpage, to share a webpage, to view webpages within a domain that are popular with the user's connection in a social networking system, etc. The tools are received and rendered within a toolbar interface including a toolbar icon for each tool. The tool interfaces associated with each icon may be displayed on the handheld computing device automatically or responsive to a user request.

18 Claims, 7 Drawing Sheets

(56) References Cited

U.S. PATENT DOCUMENTS

| | | | |
|---|---|---|---|
| 2006/0026067 A1* | 2/2006 | Nicholas | G06Q 30/00 705/14.58 |
| 2006/0031404 A1* | 2/2006 | Kassab | G06F 17/30893 709/218 |
| 2006/0036966 A1* | 2/2006 | Yevdayev | G06F 17/30873 715/779 |
| 2006/0058019 A1* | 3/2006 | Chan | G06F 17/30861 455/422.1 |
| 2006/0274869 A1* | 12/2006 | Morse | G06F 17/30905 375/352 |
| 2008/0276164 A1 | 11/2008 | Bamford | |
| 2008/0288342 A1* | 11/2008 | Ingleshwar | G06Q 30/02 705/14.54 |
| 2008/0297662 A1 | 12/2008 | Gibbs | |
| 2009/0083646 A1 | 3/2009 | Lin et al. | |
| 2009/0144392 A1* | 6/2009 | Wang | G06Q 10/10 709/217 |
| 2009/0164641 A1* | 6/2009 | Rogers | G06F 17/30867 709/227 |
| 2009/0299824 A1* | 12/2009 | Barnes, Jr. | G06F 3/04847 705/7.39 |
| 2010/0153884 A1* | 6/2010 | Chow et al. | 715/841 |
| 2010/0162165 A1* | 6/2010 | Addala | G06F 3/04886 715/810 |
| 2010/0223664 A1 | 9/2010 | Naranjo et al. | |
| 2010/0235765 A1* | 9/2010 | Worthington | G06F 17/30899 715/760 |
| 2010/0254451 A1 | 10/2010 | Melnyk et al. | |
| 2010/0325549 A1* | 12/2010 | Gibson | G06F 17/3089 715/733 |
| 2011/0191684 A1* | 8/2011 | Greenberg | 715/719 |
| 2011/0289108 A1* | 11/2011 | Bhandari | G06F 17/30905 707/769 |
| 2013/0061127 A1* | 3/2013 | Reyes | G06F 17/3089 715/234 |
| 2014/0026050 A1* | 1/2014 | Yun | G06F 3/0481 715/719 |

OTHER PUBLICATIONS

Steven Campbell, "Capture Streaming Video From Any Website With These 5 Tools," Sep. 28, 2010, makeuseof.com, pp. 1-4, as captured by WaybackMachine on Sep. 30, 2010.*

PCT International Search Report and Written Opinion, PCT Application No. PCT/US2011/061452, dated Mar. 27, 2012, 10 pages.

European Extended Search Report, European Application No. 11841177.6, dated Oct. 7, 2016, 8 pages.

European Examination Report, European Application No. 11841177.6, dated Feb. 9, 2018, 7 pages.

* cited by examiner

WEB BROWSER TOOLBAR

CROSS REFERENCE TO RELATED APPLICATIONS

This application claims the benefit of U.S. Provisional Application No. 61/415,312 filed Nov. 18, 2010, which is incorporated by reference in its entirety.

BACKGROUND

1. Field of Art

The disclosure generally relates to the field of rendering web content on an application, and particularly to rendering content on a toolbar of a web browser.

2. Description of the Related Art

Users often use mobile computing devices to browse the Internet. For example, users often use browsers executing on a mobile devices to retrieve a webpage over a network. Webpages increasingly include more than just text and images; they typically include several elements, such as an embedded video, an ability to share the webpage or recommend other webpages or content based on a popularity of the content.

Additionally, users are generally connected to other users via various social networking systems. Social networking systems often provide a framework for users to interact with each other, by allowing users to 'like' content items, or comment on content items, etc. As such, social networking systems promote interaction among users who may or may not be connected within the social networking system. In order to provide and promote content in a more social and interactive manner, webpages often also display a user's social networking system information on the webpage. For example, a webpage may display that a user's friend 'liked' a particular piece of web content and display the web content to the user along with information indicating that the user's friend liked the content.

Desktop computing browsers often render and display the elements listed above within a webpage. Desktop displays are likewise sufficiently large to handle and display the above elements in a user friendly manner. As such, a user typically views, and interacts with the elements on a webpage with relative ease. However, browsers executing on a handheld mobile computing device, such as cell phones, smart phones, personal digital assistants (PDAs) and tablet devices typically render webpages for much smaller displays. As such, a user browsing a webpage on a handheld mobile device typically has a difficult time viewing and engaging the elements listed above because they may not be displayed on the handheld mobile device, and therefore, may not be in the user's field of view. As such, web browsers and other applications displaying web content comprising social or interactive elements on handheld devices do not provide an enjoyable browsing experience to its users.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a system, method and computer readable medium comprising instructions for displaying tools in association with a webpage requested by a user. It comprises receiving tools from at least one of a content hosting server, a platform server and an optimization server. The tools comprise a webpage associated with content requested by the user or a functionality enabling a user to perform an action associated with the requested content. Additionally, a toll bar interface is rendered on a client computing device, wherein the toolbar interface comprises toolbar icons such that each toolbar icon represents a received tool. A frame is rendered responsive to a user selecting a toolbar icon, wherein a received tool is rendered within the frame. In one instance, the rendered tool may be a webpage rendered within the frame. In another instance, user interface elements representing a functionality of the tool may be rendered within the frame. In one instance, the toolbar interface is displayed within an application executing on the client computing device.

System Architecture

Figure 1:
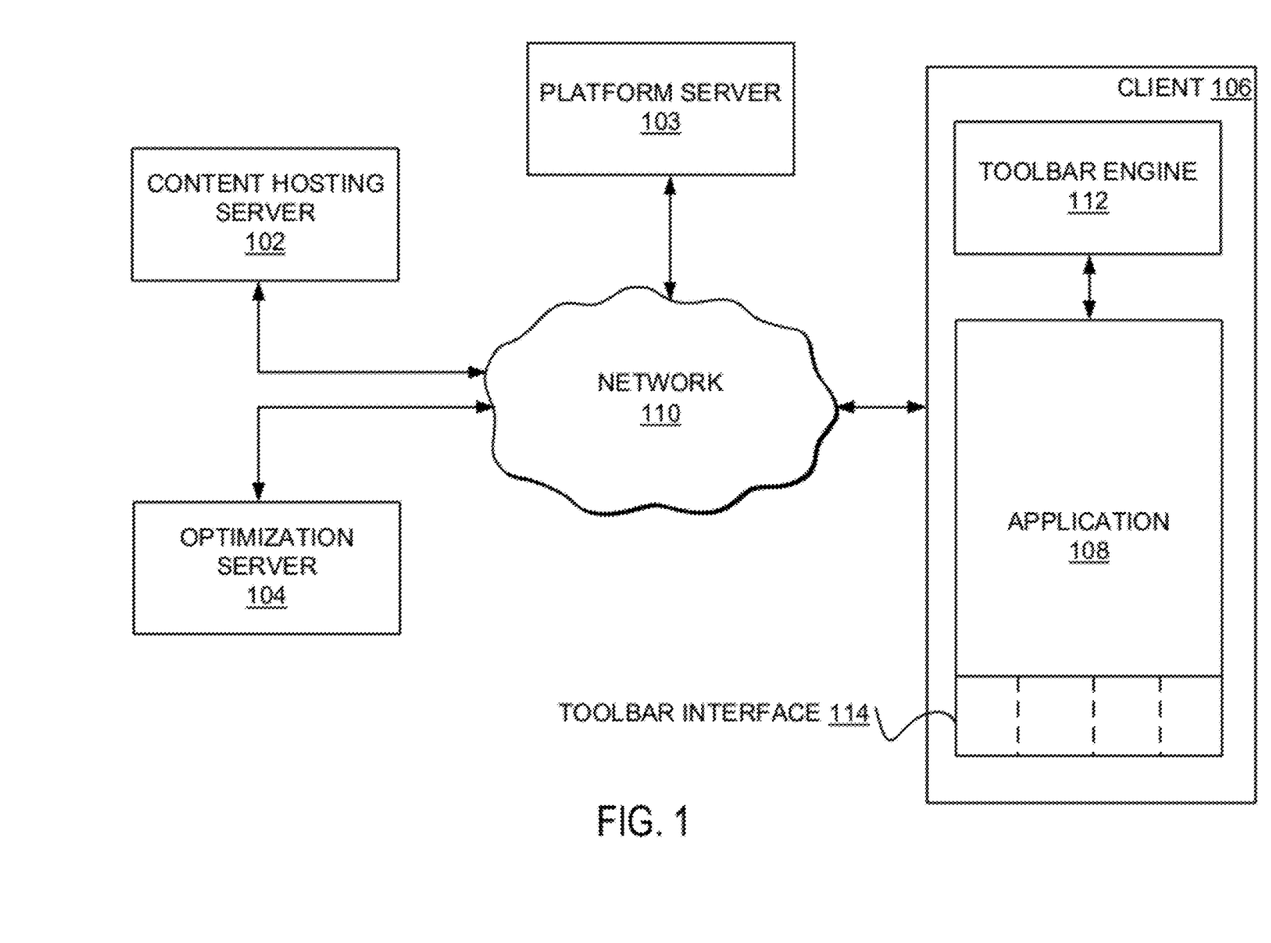
FIG. 1 is a high-level block diagram of a system environment according to one embodiment.

FIG. 1 is a high-level block diagram of a computing environment 100 according to one embodiment. It includes a content hosting server 102, a platform server 103, an optimization server 104, a client computing device 106 comprising a toolbar engine 112 and an application 108 displaying a toolbar interface 114, and a network 110.

At a high level, a content hosting server 102 provides content to display on a client computing device 106. The content may include, for example, webpages, audio/video files and/or other electronic documents. The content hosting server 102 can be, for example, a major Internet web site operated by a national media outlet, a personal blog on a web server operated by a lone individual, and/or another distributor of webpages. While only one content hosting server 102 is shown in FIG. 1, embodiments of the system can have thousands or millions of different hosting servers. Only one content hosting server 102 is shown for purposes of clarity.

The platform server 103 provides content to display to a user and also provides an interface for the user to communicate with other users of the platform. In one embodiment, the platform server 103 is a social networking system server. In such an embodiment, the platform server 103 interfaces with the toolbar engine 112 executing on a client computing device 103 to provide platform content via application programming interfaces (APIs). As such, the toolbar engine 112 receives platform content to display to a user.

An optimization server 104 optimizes content provided by a content hosting server 102 and provides the optimized content to the client computing device 106. In one embodiment, the optimization server 104 receives an optimization request from the toolbar engine 112 executing on the client computing device 106. The optimization server 104 optimizes content responsive to the request and sends the optimized content to the client computing device 106, wherein the optimized content may be displayed to a user.

The client computing device 106 represents any entity operated by a user that receives content over a network 110. The client computing device 106 is sometimes referred to as a "mobile device" or a "display device." In one embodiment, the client computing device 106 includes a computer system utilized by an end-user to communicate with other computers on the network 110 in order to view content. In other embodiments, the client computing device 106 includes a network-capable device other than a computer system, such as a personal digital assistant (PDA), a cellular telephone, a smartphone, a pager, a television "set-top box" etc. Although FIG. 1 illustrates only one client computing device 106, embodiments of the present invention can have thousands or millions of client devices connected to the network 110.

An application 108 executing on the client computing device 106 may include any application capable of executing on a client device and interfacing with the network 112, including for example, a browser. Examples of browsers include SKYFIRE, FIREFOX, INTERNET EXPLORER, CHROME, etc. The application 108 interfaces with a user and receives user requests to retrieve content over a network 110 and display it. In one embodiment, the application 108 provides the requested webpage to the toolbar engine 112 and receives a toolbar interface 114 to display to the user. In one embodiment, the toolbar interface 114 is specific to each webpage requested by the user and therefore the application 108 may receive an updated toolbar interface 114 each time the user navigates to different webpages.

The toolbar engine 112 interfaces with the content hosting server 102, the platform server 103 and the optimization server 104 to generate a toolbar interface 114 which is displayed on an application 108 executing on a client computing device 106. In one embodiment, the toolbar engine 112 generates toolbar icons displayed within the toolbar interface 114, wherein each toolbar icon represents a tool received from each one of the content hosting server 102, the platform server 103 and the optimization server 104. A user may interact with a toolbar icon to view the tool or interact with a functionality provided by the tool. In one embodiment, the toolbar engine 112 generates an i-frame or a webpage which is rendered on top of a webpage requested by a user and displayed by the application 108, wherein the i-frame displays the tool and/or its functionality. As such, users of client computing devices 106 are enabled to view content or functionality of tools provided by the content hosting server 102, the platform server 103 and the optimization server 104 within a toolbar interface 114 of an application 108.

The network 110 represents the communication pathways between the content hosting server 102, the platform server 103, the optimization server 104 and the client computing device 106. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc.

Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Example Computing Machine Architecture

Figure 2:
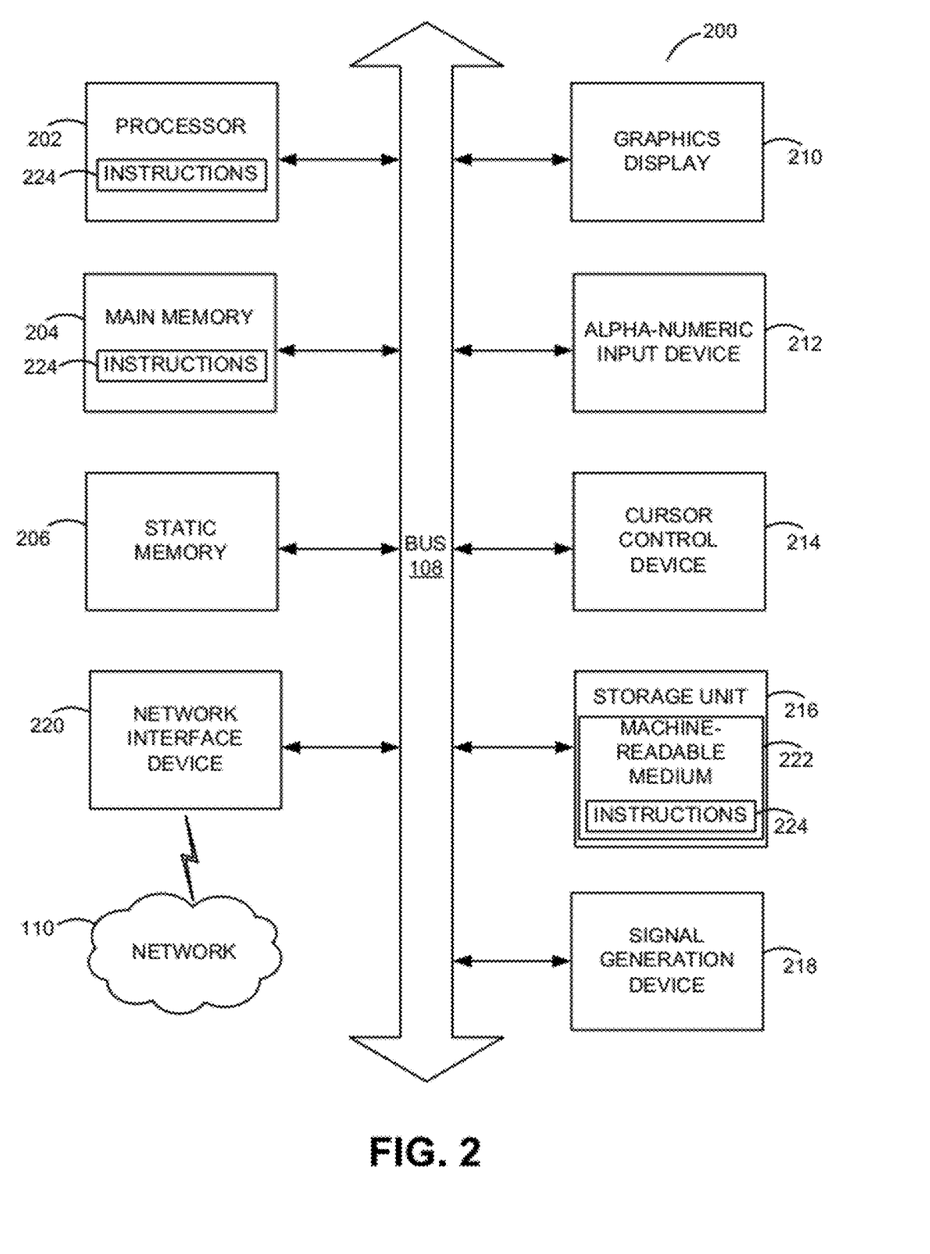
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine 200. It is noted that the computing machine 200 may be a system or part of a system, e.g., two or more machines operating together or one or more machines operating with one or more other devices. The computing entities illustrated in FIG. 1 (e.g., content hosting server 102, a platform server 103, an optimization server 104, a client computing device 106) are structured similarly to the computing machine 200 and can be further customized for particular functional configurations (e.g., operations) as described further herein.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for a Toolbar Interface

Figure 3:
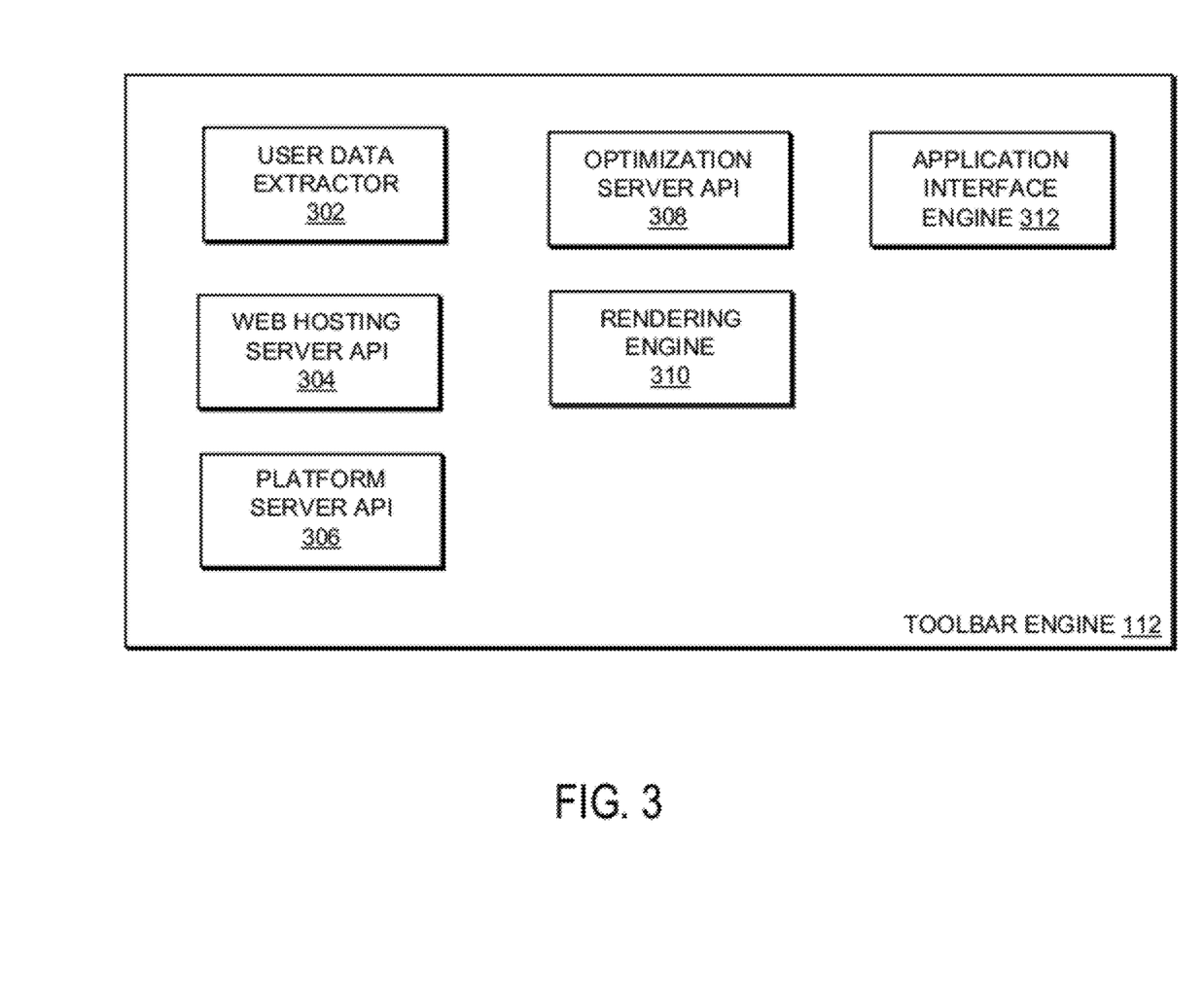
FIG. 3 illustrates one embodiment of a high level block diagram of an engine for generating a toolbar.

Referring now to FIG. 3, it illustrates an embodiment of a toolbar engine 112, in accordance with an embodiment. The toolbar engine 112 is illustrated as a high-level block diagram of modules configured to interface with a web hosting server 102, a platform server 103 and an optimization server 104 to receive content or functionality associated with tools and provide the received content or functionality within a toolbar interface 114 displayed on an application 108 executing on a client computing device 106. In one embodiment, the toolbar engine 112 includes a user data extractor 302, a web hosting server API 304, a platform server API 306, an optimization server API 308, a rendering engine 310 and an application interface engine 312.

The user data extractor 302 interfaces with the application 108 and the client device 106 to identify a user's data. For example, the user data extractor 302 may identify a user's identification (ID) and password to log into a webpage, a social networking system, etc. In addition, the user data extractor 302 may identify cookies or other identifying information about a user to interface with external sites, including web hosting servers 102, platform servers 103 and optimization server 104.

The application interface engine 312 interfaces with the application 108 to identify webpages requested by a user. In one embodiment, the application interface engine 312 receives URLs requested by a user via an application 108 and sends it to each one of the web hosting server API 304, the platform server API 306 and the optimization server API 308.

The web hosting server API 304 interfaces with a content hosting server 102 to receive webpage specific tools. Webpage specific tools may include, for example, a one-click check-out tool enabling a user to purchase an item on a webpage by interacting with a user interface element. In other instances the webpage specific tool includes a webpage displaying a leader-board of users associated with the webpage, etc. In such an instance, the toolbar engine 112 receives the webpage specific tool and displays it in association with a toolbar interface 114 of an application 108.

The platform server API 306 112 interfaces with a platform server 103 to receive tools associated with the platform. For example, if a platform server 103 is a social networking system server, the toolbar engine 112 receives, via APIs, social networking system tools, such as a 'like' button or a '+1' button that enables a user to share a preference or a recommendation with other users of the social networking system. In such an embodiment, the toolbar engine 112 provides a webpage URL and user actions to the platform server 103, wherein the platform server associates the webpage URL with a user preference and shares the user preference with other users within the social networking system. In one embodiment, the platform server API 306 receives user data from the user data extractor 302 to log into a platform server 103.

The optimization server API 308 112 interfaces with the optimization server 104 to receive optimized tools or content. A webpage may include broken content that cannot be displayed or cannot be optimally displayed on an application 108 executing on the client device. In such an instance, the toolbar engine 112 sends the a link to the broken content to the optimization server 104, wherein the optimization server 104 retrieves the broken content from an appropriate server and optimizes the content for the client computing device 106. In one embodiment, the optimization server 104 optimizes content based on capabilities of the client computing device 106 and network 110 capabilities for sending data to the client computing device 106. The toolbar engine 112 receives the optimized content from the optimization server 104 and displays it to a user in association with the toolbar interface 114 displayed on the application. For example, if an application 108 cannot play FLASH videos, the toolbar engine 112 sends a link to the video to the optimization server 104 wherein the video is optimized enable playback on the application 108. The toolbar engine receives the optimized video and generates a toolbar icon for a toolbar interface 114 wherein a user can select the generated icon to view the video within an interface associated with the toolbar 114.

Figure 5:
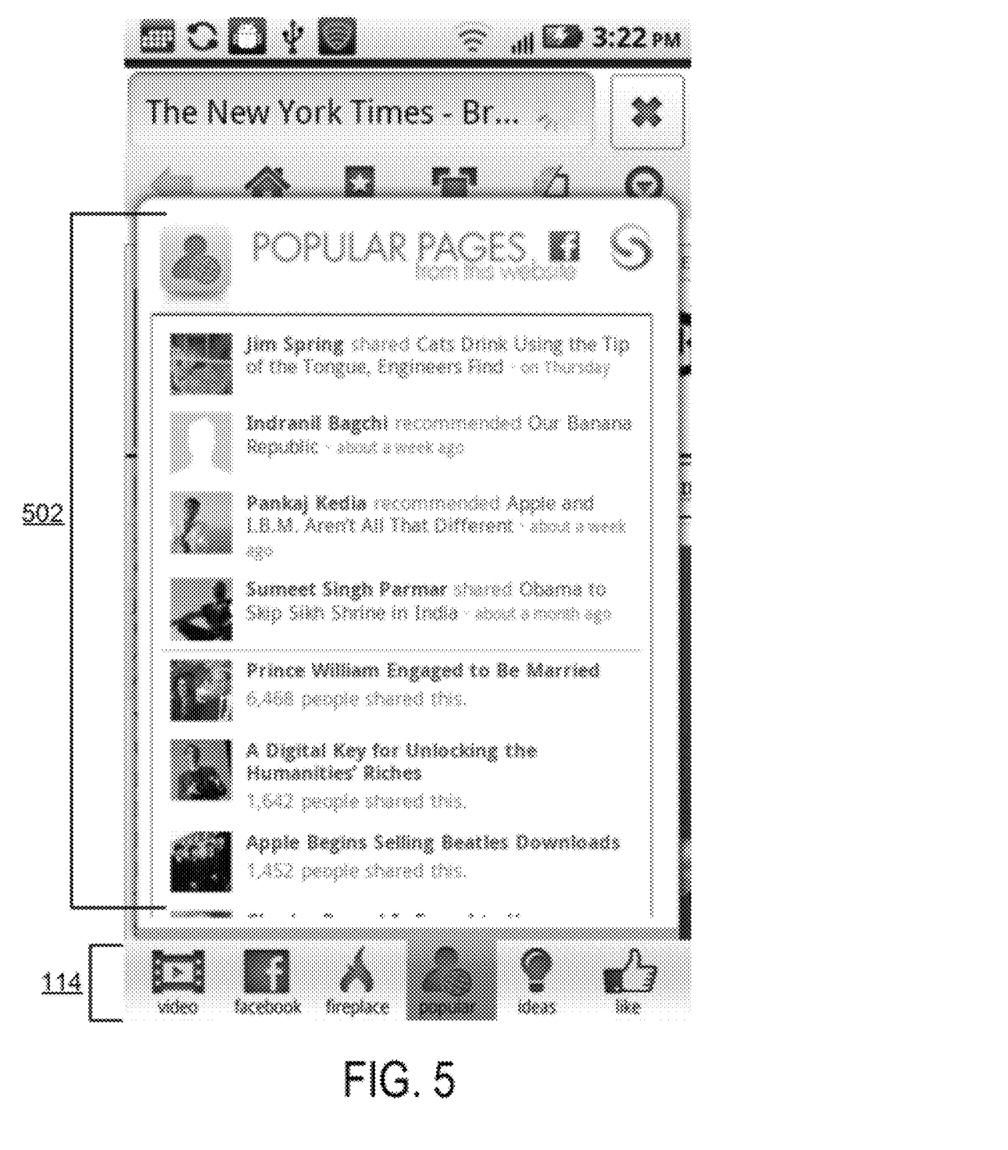
FIG. 5 illustrates a user interface displaying a webpage in a toolbar interface, in accordance with an embodiment.
Figure 6:
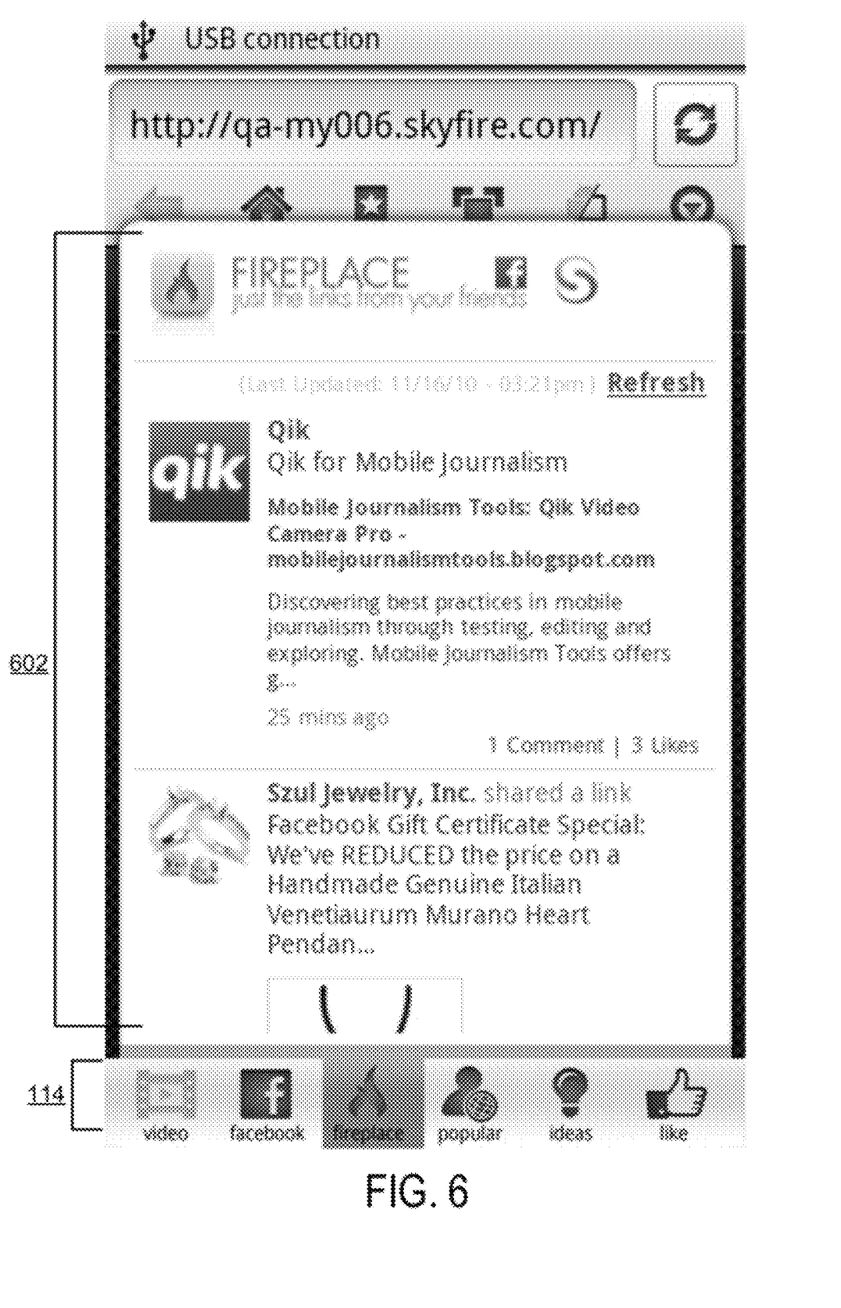
FIG. 6 illustrates a user interface displaying web content within a toolbar interface, in accordance with an embodiment.
Figure 7:
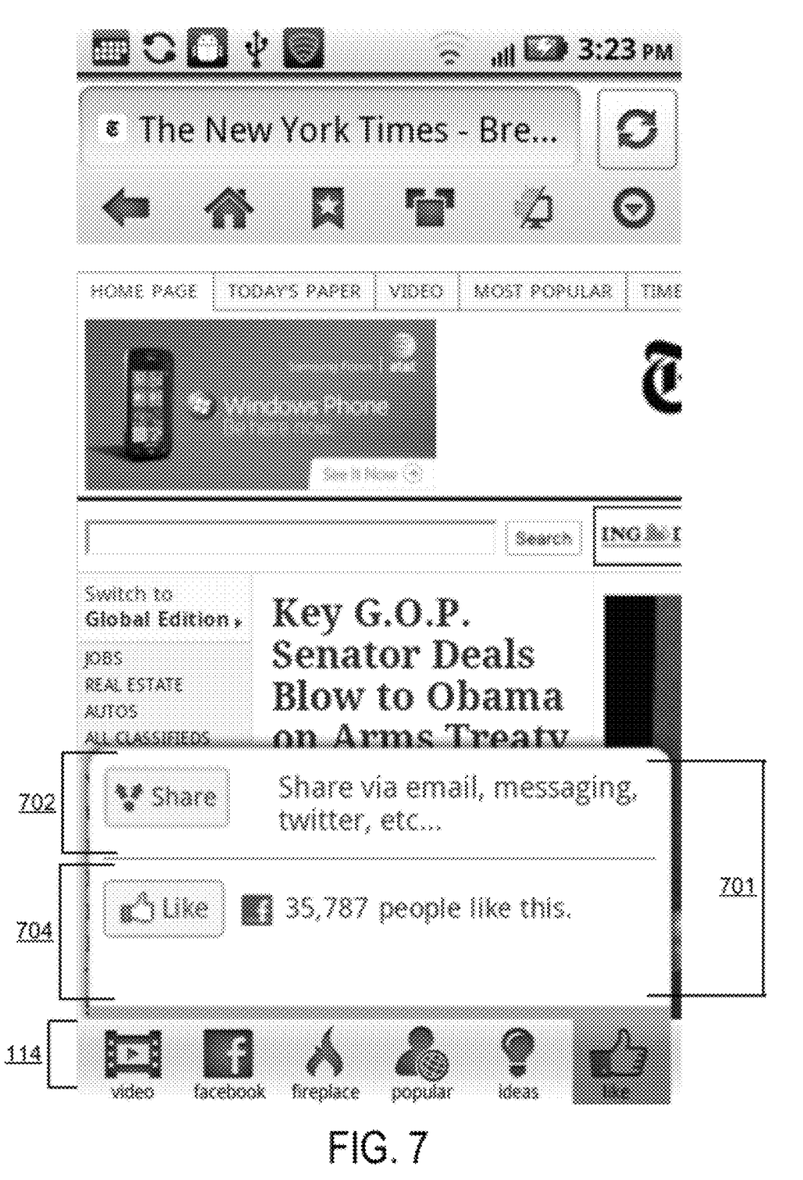
FIG. 7 illustrates a user interface displaying a webpage and web content within a toolbar interface, in accordance with an embodiment.

The rendering engine 310 renders toolbar icons displayed within the toolbar interface 114, wherein each toolbar icon represents a tool received from each one of the web hosting server AP 304, the platform server API 306 and the optimization server API 308. In addition, the rendering engine 310 generates an i-frame or a webpage which is rendered on top of a webpage requested by a user and displayed by the application 108, wherein the i-frame displays the tool and/or its functionality represented by a toolbar icon. As described in the specification, a tool may be webpage or the tool may provide content or functionality such as 'check-out' to enable a user to purchase an item. If the tool is a webpage, the rendering engine 310 renders the webpage within the i-frame. If the tool is a functionality, the rendering engine 310 renders content to display to a user. In one embodiment, the client computing device renders the user interface representing the tool functionality. In another embodiment, the rendering engine 310 displays both within an i-frame by displaying the webpage within a portion of the i-frame and rendering content enabling a functionality within another portion of the i-frame. In one embodiment, the rendering engine 310 updates toolbar icons with badges as additional content associated with a tool is received from one of the web hosting server API 304, the platform server API 306 or the optimization server API 308. FIGS. 5-7 provide example illustrations of a toolbar interface 114 displaying content associated with tools within an i-frame.

FIG. 5 illustrates an exemplary user interface rendered by the rendering engine 310 and displayed by an application 108 executing on a client device 106. The interface includes a toolbar interface 114 and an i-frame 502. As described in the specification, tools and content associated with tools may be retrieved from a content hosting server 102, a platform server 103 or an optimization server 104. Each tool is represented as an icon within the toolbar interface 114. In addition, when a tool icon is selected, an i-frame is generated and populated with content. In one embodiment, the content associated with a toolbar is a webpage. In such an embodiment, the webpage is rendered within the i-frame 502.

FIG. 6 illustrates an exemplary user interface rendered by the rendering engine 310 and displayed by an application 108 executing on a client device 106. The interface includes a toolbar interface 114 and a client rendered user interface. As described in the specification, tools and content associated with tools may be retrieved from a content hosting server 102, a platform server 103 or an optimization server 104. Each tool is represented as an icon within the toolbar interface 114. In addition, when a tool icon is rendered on the client device. In one embodiment, the content associated with a toolbar is a functionality enabled by a webpage. In such an embodiment, the functionality is rendered without the i-frame 602.

FIG. 7 illustrates an exemplary under interface rendered by the rendering engine 310 and displayed by an application 108 executing on a client device 106. The interface includes a toolbar interface 114. As described in the specification, tools and content associated with tools may be retrieved from a content hosting server 102, a platform server 103 or an optimization server 104. Each tool is represented as an icon within the toolbar interface 114. In addition, when a tool icon is selected, an interface is generated and populated with content. In one embodiment, the content associated with a toolbar icon is a webpage and a functionality enabled by a webpage. In such an embodiment, the webpage 704 is rendered to display to the user.

The application interface engine 312 interfaces with an application 108 executing on the client computing device 106 to render a toolbar interface 114. In one embodiment, the application 108 is a browser displaying webpages requested by a user. The application interface engine 312 interfaces with the application to render a toolbar interface including toolbar icons on the application.

Process for Displaying a Toolbar Interface

Figure 4:
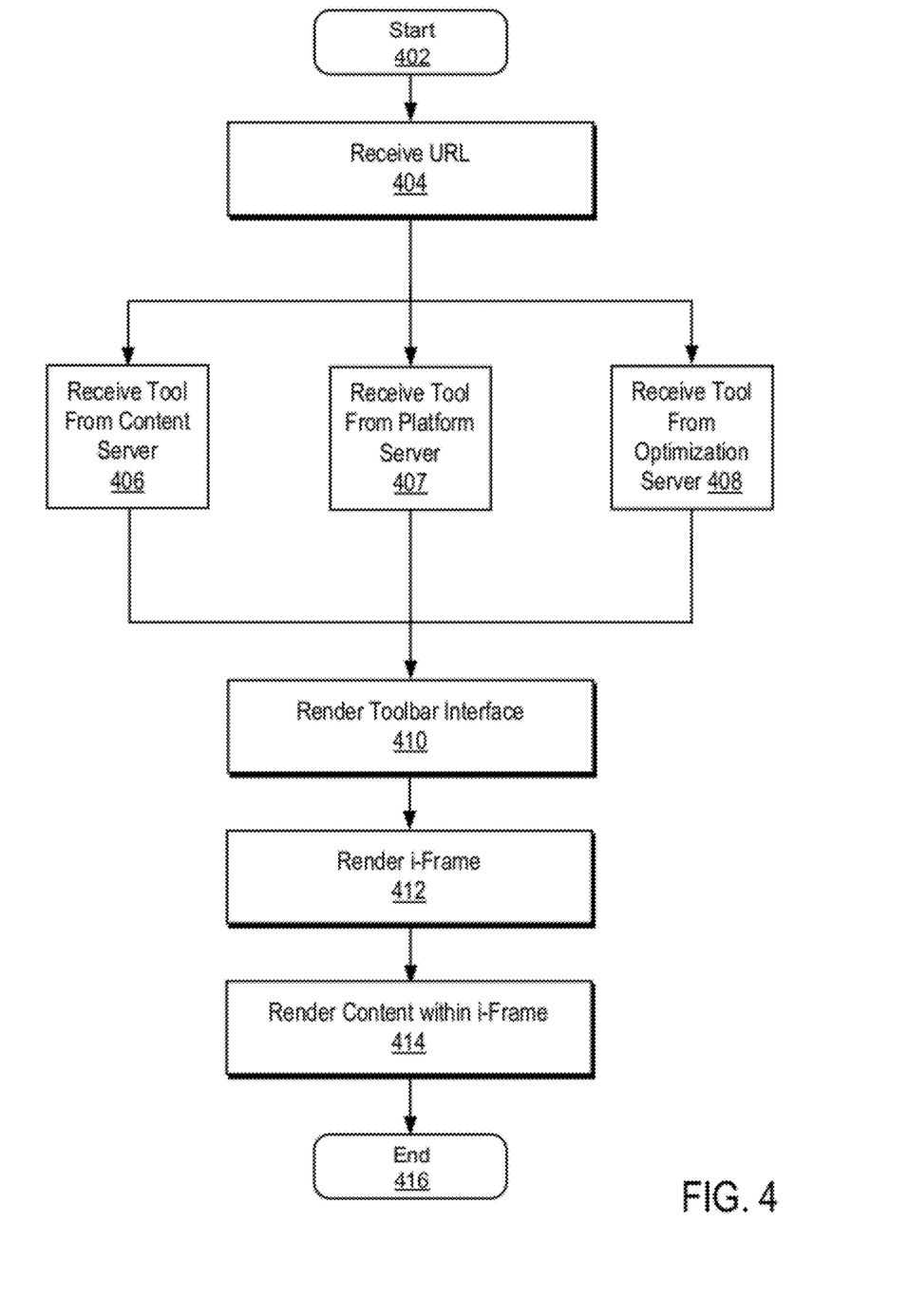
FIG. 4 illustrates one embodiment of a process for generating a toolbar for an application.

FIG. 4 illustrates one embodiment of a process for generating a toolbar interface for an application. In one embodiment, the process starts 402 when a URL requested by a user is received 404 on an application executing on a client device. In another embodiment, the process runs statically, without a URL by using a default configuration or a user's behavioral data. In one embodiment, responsive to the requested URL or a user's data/default configuration, a tool is received 406 from a content server associated with the URL. The tool may be specific to a webpage, for example, a leader-board of users associated with a game webpage, or a check-out interface enabling a user to purchase an item on the webpage, etc.

In addition, the process receives 407 a tool from a platform server. The platform server may be a social networking system server, for example and its tool may include interface elements that allow a user to share the requested webpage with other users of the social networking system. Similarly, the tool may include information such as recommendations by other users of the social networking system for viewing webpages within a website associated with the requested webpage, etc.

The process may also receive 408 a tool from an optimization server. The optimization server optimizes content that may not be viewable on an application executing on the client device. In such an instance, the optimization server may optimize the un-viewable content such that it may be viewed on the application. The tool therefore may include optimized content viewable on an application executing on a client device.

The process renders 410 a toolbar interface wherein each tool is represented by a toolbar icon. In one embodiment, the toolbar interface comprises of a plurality of toolbar icons. For example, an optimized video received 408 from the optimization server may be represented by a 'video' toolbar icon within a toolbar interface. In addition, the process renders 412 an i-frame or a webpage in which to display toolbar content. The i-frame may be rendered 412 on top of a webpage requested by a user. In one embodiment, the i-frame is rendered responsive to a user requesting content associated with a toolbar icon. In another embodiment, the i-frame is generated as a pop-up frame, without reference to a user selection. The process renders 414 content associated with a tool within the i-frame. As described in the specification, toolbar content may be a webpage or it may be a functionality provided by one of the content server, the platform server or the optimization server. In an instance wherein the toolbar content is a webpage, the webpage is rendered 414 within the i-frame. In an embodiment wherein the toolbar content is a functionality, a user interface illustrating the functionality is rendered 414 without an i-frame. The process ends 414 when a user closes an application displaying the toolbar interface or navigates to another webpage.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of modules (e.g., components, engines, or mechanisms), for example, as described in FIGS. 1 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 204 or storage 216). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., computer 200) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying embedded page elements within a toolbar interface including tool icons through the disclosed principles herein. For example, the server encodes the text and image data such that the text data does not lose any resolution and can be rendered perfectly at any zoom level on the client device. Image data is considered less important to the browsing experience, however, as is delivered as a low resolution image data which may appear blocky and stretched out during an intermediate stage after the zoom in and before a hi-resolution image is retrieved and delivered to the client device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing online functionality in association with webpages requested by an application of a client device, the method comprising:
   interfacing with the application to determine identifying information about a webpage when the webpage is requested by the application for each of a plurality of webpages requested by the application;
   transmitting, in response to the application requesting the webpage, the identifying information about the webpage to a plurality of servers, at least one server associated with a third party service;
   identifying video content items within the webpage for optimization;
   receiving one or more different webpage specific tools from different ones of the plurality of servers based on the identifying information transmitted to the servers to comprise a set of tools in a tool bar received independently from the webpage, a tool in the set of tools configured to enable a user of the client device to perform an action specific to the webpage and associated with the user on the third party service through the server from which the tool was received based on the identifying information about the webpage transmitted to the server, the application displaying the webpage;
   rendering a toolbar interface including a set of toolbar icons corresponding to the set of received tools;
   rendering, in response to receiving a selection of a toolbar icon, a tool interface overlaying the application and comprising a selectable element representative of the action associated with the user on the third party service;
   rendering the selectable element within the tool interface in association with a given video content item, the selectable element indicating optimization of the video content item for the user;
   transmitting, in response to a selection of the selectable element, instructions compatible with the interface of the server associated with the third party service that cause the server to optimize the content of the given video content item for the user and stream optimized video for the given content item to the client device; and
   providing for display the optimized video within the tool interface.

2. The method of claim 1, wherein receiving a set of tools independently from the webpage comprises:
   interfacing with the application to determine identifying information about the user of the client device; and
   transmitting the identifying information about the user to at least one of the servers, the at least one server providing one or more tools in the set of tools responsive to the identifying information.

3. The method of claim 1, wherein the third party service is an optimization service and the tool in the set of tools received is an optimized video tool, the optimized video tool having functionality enabling the user of the client device to request optimization of video content within the webpage requested by the application for the user through the optimization service within the tool interface.

4. The method of claim 1, wherein a second tool in the set of tools is a webpage specific tool configured to enable the user of the client device to perform an action within the webpage and/or a website associated with the webpage.

5. The method of claim 1, wherein the set of tools comprises at least one of a video tool configured to playback videos within a tool interface, a feed tool configured to display a feed within a tool interface, a share tool configured to recommend content of the requested webpage to other users, a check-out tool configured to automate a purchase with the requested webpage, and a view popular tool configured to recommend content to the user.

6. The method of claim 1, further comprising receiving additional content from the server associated with the third party service for the tool and updating the toolbar icon correspondence to the tool with a badge in response to the additional content.

7. The method of claim 1, wherein the third party service is a social network platform and the tool is a social networking system tool, the social networking system tool having functionality enabling the user of the client device to request the social networking system recommend, for the user, content of the webpage to other users of the social networking platform.

8. The method of claim 1, wherein rendering a tool interface overlaying the application comprises:
generating a frame overlaying the application; and
rendering content of the tool interface within the frame, wherein the content of the tool interface includes the selectable element representative of the action associated with the user on the third party service.

9. The method of claim 1, wherein content of the tool interface identifies video content items within the website for playback within the tool interface.

10. The method of claim 1, wherein the client device receives the tool in the set of tools responsive to transmitting the identifying information about the webpage to the server.

11. The method of claim 1, wherein the client device receives the tool in the set of tools responsive to further transmitting information about an online account of the user of the client device to the server.

12. A non-transitory computer-readable storage medium storing executable computer program instructions for providing online functionality in association with webpages requested by an application of a client device, the instructions when executed performing steps comprising:
interfacing with the application to determine identifying information about a webpage when the webpage is requested by the application for each of a plurality of webpages requested by the application;
transmitting, in response to the application requesting the webpage, the identifying information about the webpage to a plurality of servers, at least one server associated with a third party service;
identifying video content items within the webpage for optimization;
receiving one or more different webpage specific tools from different ones of the plurality of servers based on the identifying information transmitted to the servers to comprise a set of tools in a toolbar received independently from the webpage, a tool in the set of tools configured to enable a user of the client device to perform an action specific to the webpage and associated with the user on the third party service through the server from which the tool was received based on the identifying information about the webpage transmitted to the server;
rendering a toolbar interface including a set of toolbar icons corresponding to the set of received tools;
rendering, in response to receiving a selection of a toolbar icon, a tool interface overlaying the application and comprising a selectable element representative of the action associated with the user on the third party service;
rendering the selectable element within the tool interface in association with a given video content item, the selectable element indicating optimization of the video content item for the user;
transmitting, in response to a selection of the selectable element, instructions compatible with the interface of the server associated with the third party service that cause the server to optimize the content of the given video content item for the user and stream optimized video for the given content item to the client device; and
providing for display the optimized video within the tool interface.

13. The computer-readable storage medium of claim 12, wherein receiving a set of tools independently from the webpage comprises:
interfacing with the application to determine identifying information about the user of the client device; and
transmitting the identifying information about the user to at least one of the servers, the at least one server providing one or more tools in the set of tools responsive to the identifying information.

14. The computer-readable storage medium of claim 12, wherein the third party service is an optimization service and the tool in the set of tools received is an optimized video tool, the optimized video tool having functionality enabling the user of the client device to request optimization of video content within the webpage requested by the application for the user through the optimization service within the tool interface.

15. The computer-readable storage medium of claim 12, wherein a second tool in the set of tools is a webpage specific tool configured to enable the user of the client device to perform an action within the webpage and/or a website associated with the webpage.

16. The computer-readable storage medium of claim 12, wherein the set of tools comprises at least one of a video tool configured to playback videos within a tool interface, a feed tool configured to display a feed within a tool interface, a share tool configured to recommend content of the requested webpage to other users, a check-out tool configured to automate a purchase with the requested webpage, and a view popular tool configured to recommend content to the user.

17. The computer-readable storage medium of claim 12, further comprising receiving additional content from the server associated with the third party service for the tool and updating the toolbar icon correspondence to the tool with a badge in response to the additional content.

18. A system for providing online functionality in association with webpages, the system comprising:
a processor; and
a non-transitory computer readable storage medium comprising stored computer program instructions for a toolbar engine, the instructions when executed causes the processor to:
interface with an application to determine identifying information about a webpage when the application retrieves the webpage for each of the webpages;
transmit, in response to the application retrieving a webpage, the identifying information about the webpage to a plurality of servers, at least one server associated with a third party service;
identify video content items with the webpage for optimization;

receive one or more different webpage specific tools from different ones of the plurality of servers based on the identifying information transmitted to the servers to comprise a set of tools in a toolbar received independently from the webpage, a given tool in the set of tools configured to enable the user of the client device to perform an action specific to the webpage and associated with the webpage through a server associated with functionality of the given tool from which the tool was received based on the identifying information about the webpage;

render a toolbar interface including a set of toolbar icons corresponding to the set of received tools, the toolbar engine rendering the toolbar interface as an overlay of the application;

render, in response to receiving a selection of the given tool within the toolbar interface, a tool interface overlaying the application and comprising a selectable element associated with the functionality of the given tool;

render the selectable element within the tool interface in association with a given video content item, the selectable element indicating optimization of the video content item for the user;

transmit, in response to a selection of the selectable element, instructions compatible with the interface of the server associated with the third party service that cause the server to optimize the content of the given video content item for the user and stream optimized video for the given content item to the client device; and provide for display the optimized video within the tool interface.

* * * * *